(12) United States Patent
Oh et al.

(10) Patent No.: US 12,330,491 B2
(45) Date of Patent: Jun. 17, 2025

(54) HIGH-VOLTAGE BATTERY PACK FOR VEHICLE

(71) Applicants: Hyundai Motor Company, Seoul (KR); Kia Corporation, Seoul (KR)

(72) Inventors: Mee Sun Oh, Hwaseong-si (KR); Jae Hyeon Ju, Seoul (KR); Chang Mo Sung, Gunpo-si (KR); Tae Hyuck Kim, Asan-si (KR); Min Seok Seo, Gimpo-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 329 days.

(21) Appl. No.: 17/970,769

(22) Filed: Oct. 21, 2022

(65) Prior Publication Data
US 2023/0339303 A1    Oct. 26, 2023

(30) Foreign Application Priority Data
Apr. 25, 2022   (KR) .................... 10-2022-0050716

(51) Int. Cl.
| | |
|---|---|
| *B60K 1/04* | (2019.01) |
| *B60L 50/60* | (2019.01) |
| *H01M 50/204* | (2021.01) |
| *H01M 50/249* | (2021.01) |
| *H01M 50/505* | (2021.01) |

(52) U.S. Cl.
CPC ............. *B60K 1/04* (2013.01); *B60L 50/66* (2019.02); *H01M 50/204* (2021.01); *H01M 50/249* (2021.01); *H01M 50/505* (2021.01); *B60K 2001/0438* (2013.01); *H01M 2220/20* (2013.01)

(58) Field of Classification Search
CPC ................. B60K 2001/0438; B60L 50/66
See application file for complete search history.

(56) References Cited

U.S. PATENT DOCUMENTS

| | | | | |
|---|---|---|---|---|
| 11,719,030 B2* | 8/2023 | Marega | ................. | E05F 15/638 |
| | | | | 49/362 |
| 2013/0078496 A1 | 3/2013 | Lim et al. | | |
| 2013/0078498 A1* | 3/2013 | Favaretto | ................ | B60L 50/66 |
| | | | | 429/158 |
| 2019/0382051 A1* | 12/2019 | Toyota | .................... | B62D 25/02 |
| 2020/0376948 A1* | 12/2020 | Yamada | .................. | B60L 50/66 |
| 2020/0406764 A1* | 12/2020 | Konno | ..................... | B60K 1/04 |
| 2021/0016725 A1* | 1/2021 | Yamashita | ............ | E05F 15/655 |
| 2021/0184197 A1* | 6/2021 | Obeid | ............... | H01M 10/4257 |
| 2022/0032757 A1* | 2/2022 | An | ....................... | B62D 21/157 |
| 2022/0094006 A1* | 3/2022 | Shin | ..................... | H01M 50/211 |

FOREIGN PATENT DOCUMENTS

KR        20130032959 A      4/2013

* cited by examiner

*Primary Examiner* — Brian L Swenson
(74) *Attorney, Agent, or Firm* — Slater Matsil, LLP

(57) ABSTRACT

An embodiment high-voltage battery pack for mounting under a vehicle body in a vehicle equipped with a sliding door includes a lower casing in which a battery module is mounted, the lower casing defining a rail mounting space to mount a door rail on a lateral side of the battery module, the rail mounting space extending in a front-rear direction, and a bus bar and a sensing wire both mounted in the rail mounting space to electrically connect the battery module and electric components mounted on the lower casing.

19 Claims, 7 Drawing Sheets

HIGH-VOLTAGE BATTERY PACK FOR VEHICLE

CROSS-REFERENCE TO RELATED APPLICATIONS

This application claims the benefit of Korean Patent Application No. 10-2022-0050716, filed on Apr. 25, 2022, which application is hereby incorporated herein by reference.

TECHNICAL FIELD

The present invention relates to a high-voltage battery pack for a vehicle.

BACKGROUND

Hybrid electric vehicles, fuel cell vehicles, electric vehicles, and eco-friendly vehicles are all configured to drive a vehicle using an electric motor, and thus essentially include a high-voltage battery pack that provides driving power to the electric motor.

A high-voltage battery pack generally includes a battery casing, a plurality of battery modules mounted in the battery casing, and battery management units (BMUs) that detect voltage, current, and temperature of respective unit cells constituting the battery module and control the operation of the respective unit cells.

The battery casing includes an upper casing and a lower casing in which a plurality of battery modules and BMUs are mounted and that is covered by the upper casing.

The battery module includes a plurality of stacked battery cells, a pair of end plates that is coupled to left and right sides of the stacked battery cells to protect the battery cells, and a pair of sensing blocks that is connected to front and rear sides of the stacked battery cells to electrically connect adjacent battery cells.

On the other hand, recreational vehicles (RVs), which have three or more rows of seats, adopt sliding doors for the convenience of rear seat occupants except for a driver and a passenger on the first row of seats.

In this case, a door rail is installed on a vehicle body in the longitudinal direction of a vehicle such that the sliding door moves forward and backward along the door rail to open and close an interior space of the vehicle.

In the case of a vehicle equipped with a sliding door as described above, the high-voltage battery pack is installed at a lower part of a vehicle body (a lower part of a center floor) in order to maximize the usability of the vehicle interior space.

In the case of a structure in which a high-voltage battery pack is installed under a vehicle body in a vehicle equipped with a sliding door, a rail mounting space for installing the door rail needs to be necessarily secured on the lateral side of the high-voltage battery pack.

In addition, the conventional high-voltage battery pack is provided with a longitudinal cross member traversing the middle part of the battery casing back and forth in order to secure collision safety, and a bus bar, a sensing wire, and the like for connecting the battery cells and electric components using the longitudinal cross member.

However, both the rail mounting space and the longitudinal cross member of the conventional high-voltage battery pack are factors that reduce the number of mounted battery cells, and thus the required energy capacity of the battery cannot be increased.

In addition, there are also disadvantages in that the cost and the weight increase due to the longitudinal member.

The foregoing is intended merely to aid in the understanding of the background of embodiments of the present invention, and is not intended to mean that the present invention falls within the purview of the related art that is already known to those skilled in the art.

SUMMARY

The present invention relates to a high-voltage battery pack for a vehicle. Particular embodiments relate to a high-voltage battery pack installed under a vehicle body in a vehicle having a sliding door.

Accordingly, embodiments of the present invention keep in mind problems occurring in the related art, and an embodiment of the present invention provides a high-voltage battery pack that is mounted under a vehicle body in a vehicle equipped with a sliding door and in which a rail mounting space for mounting a door rail is secured on a lateral side of the high-voltage battery pack, and a bus bar and a sensing wire for connecting the battery cells and electric components are provided using the rail mounting space so that the vertical cross member can be removed from the conventional high-voltage battery pack, which makes it possible to secure an additional battery mounting space, and thus increase the number of battery cells to be mounted in the additionally secured battery mounting space, thereby increasing the battery capacity.

In addition, another embodiment of the present invention provides a high-voltage battery pack that is mounted under a vehicle body in a vehicle equipped with a sliding door and from which a longitudinal cross member is removed, thereby achieving cost reduction and weight reduction.

In order to accomplish the above features, according to an embodiment of the present invention, there is provided a high-voltage battery pack mounted under a vehicle body in a vehicle equipped with a sliding door, the high-voltage battery pack including a lower casing in which a battery module is mounted, a rail mounting space for mounting a door rail on a lateral side of the mounted battery module provided to extend in a front-rear direction thereof, and a bus bar and a sensing wire both mounted in the rail mounting space to electrically connect the battery module and electric components mounted on the lower casing.

The lower casing may include first and second transverse cross members extending in a horizontal direction thereof while being spaced apart in the front-rear direction, wherein the lower casing has three battery mounting spaces defined by the first and second transverse cross members.

In the three battery mounting spaces, a first battery mounting space and a second battery mounting space may have the same size, and a third battery mounting space may have a relatively small size compared to the first battery mounting space and the second battery mounting space.

The first battery mounting space and the second battery mounting space having the same size may accommodate the same type battery modules, respectively, and the third battery mounting space having a different size from that of the first battery mounting space may accommodate a different type battery module from that accommodated in the first battery mounting space.

No members other than the first and second transverse cross members may be mounted in the battery mounting spaces.

The high-voltage battery pack may further include a pair of outer lateral members provided on the left and right sides of the lower casing to extend in the front-rear direction so as to be coupled to the vehicle body.

The lower casing may be provided with a protrusion to be coupled with an upper casing at a position spaced apart outwards from one lateral side of the battery module to extend in the front-rear direction, wherein based on the protrusion, a space between the battery module and the protrusion becomes the rail mounting space, and the opposite portion becomes the outer lateral member.

The lower casing may be provided with a first support part in close contact with one lateral side of the battery module in the rail mounting space and extending in the front-rear direction such that the bus bar is supported on the first support part.

The lower casing may be provided with a second support part extending in the front-rear direction while being connected to the first support part such that the sensing wire is supported on the second support part.

The protrusion and the second support part may be spaced apart from each other by a predetermined distance, so that a safety space is secured therebetween.

The high-voltage battery pack may further include an outer front member and an outer rear member provided at the front and rear sides of the lower casing so as to be coupled to the vehicle body.

The outer lateral members, the outer front member, and the outer rear member may form a load pass for an external impact.

The rail mounting space may be formed such that one side thereof facing the battery module is provided in a plane extending in a straight line in the front-rear direction, and the battery module may be mounted such that one side thereof facing the rail mounting space extends in a straight line in the front-rear direction.

In the high-voltage battery pack for a vehicle according to an embodiment of the present invention, with the configuration in which the rail mounting space for mounting the door rail is secured on one side of the battery module mounted on the lower casing, the bus bar and the sensing wire connecting the battery module (battery cells) and electric components are mounted by utilizing the rail mounting space, and not the longitudinal cross member, but the first and second transverse cross members are only mounted in the space of the lower casing where the battery module is mounted, it is possible to additionally secure the battery mounting space by utilizing the space for the omitted longitudinal cross member, and increase the number of battery cells to be mounted, by using the additionally secured battery mounting space, thereby providing the effect of increasing the battery capacity.

In addition, the high-voltage battery pack according to embodiments of the present invention has the configuration in which the longitudinal cross member is not mounted in the battery mounting space of the lower casing, thereby achieving a reduction in cost and weight.

In addition, in the high-voltage battery pack according to embodiments of the present invention, with the configuration in which the same type of first battery module is mounted in the first battery mounting space and the second battery mounting space in the lower casing, which have the same size, and the different type of second battery module is mounted in the third battery mounting space having a different size from those of the first and second battery mounting spaces, a total of two types of battery modules are mounted so that the efficiency of the battery mounting space is improved, thereby particularly providing the effect of reducing the types of the battery modules to be mounted on the lower casing.

DETAILED DESCRIPTION OF ILLUSTRATIVE EMBODIMENTS

Figure 1:
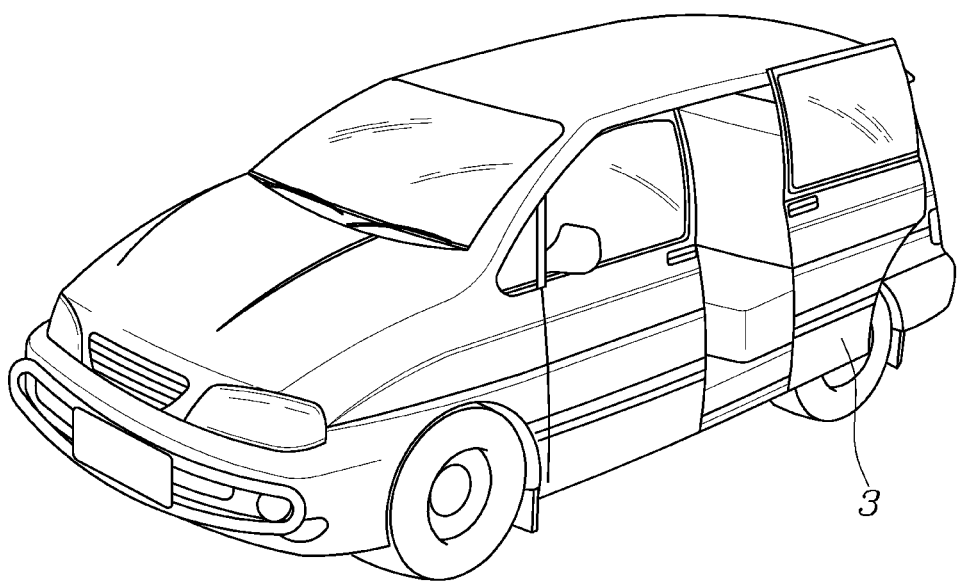
FIG. 1 illustrates a vehicle equipped with a sliding door.
Figure 2:
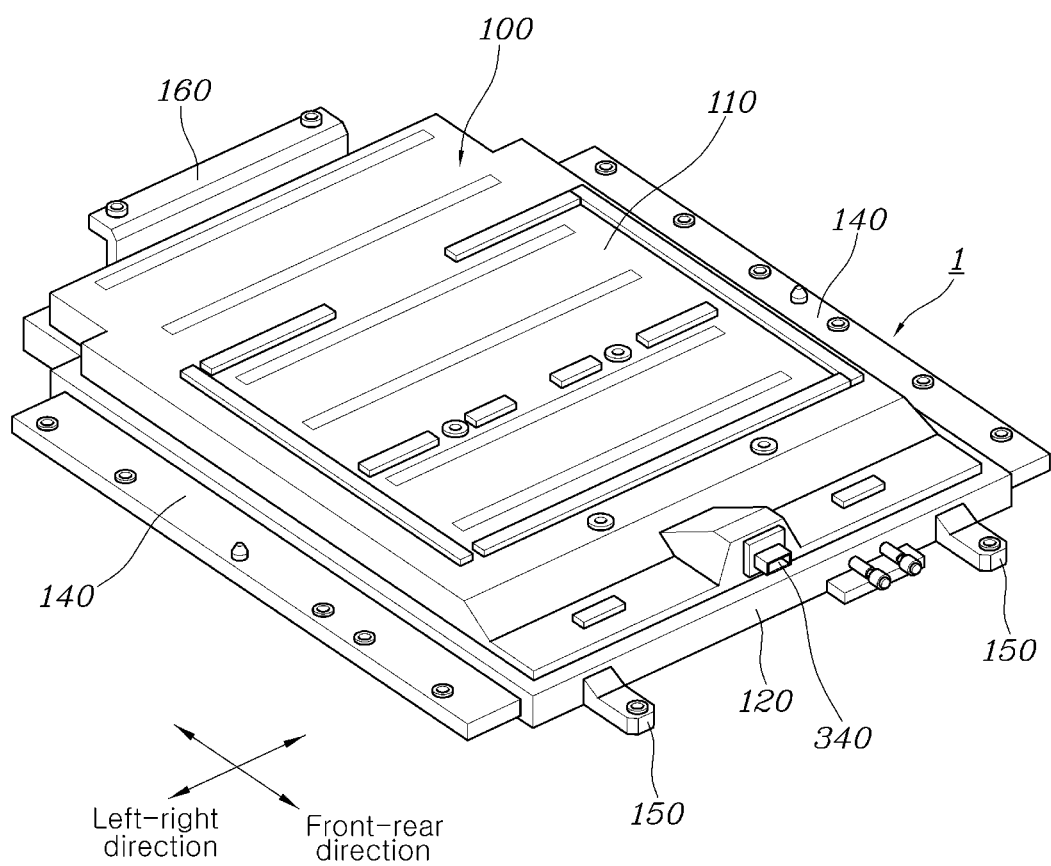
FIG. 2 is a perspective view illustrating a high-voltage battery pack mounted on the vehicle of FIG. 1 according to embodiments of the present invention.
Figure 3:
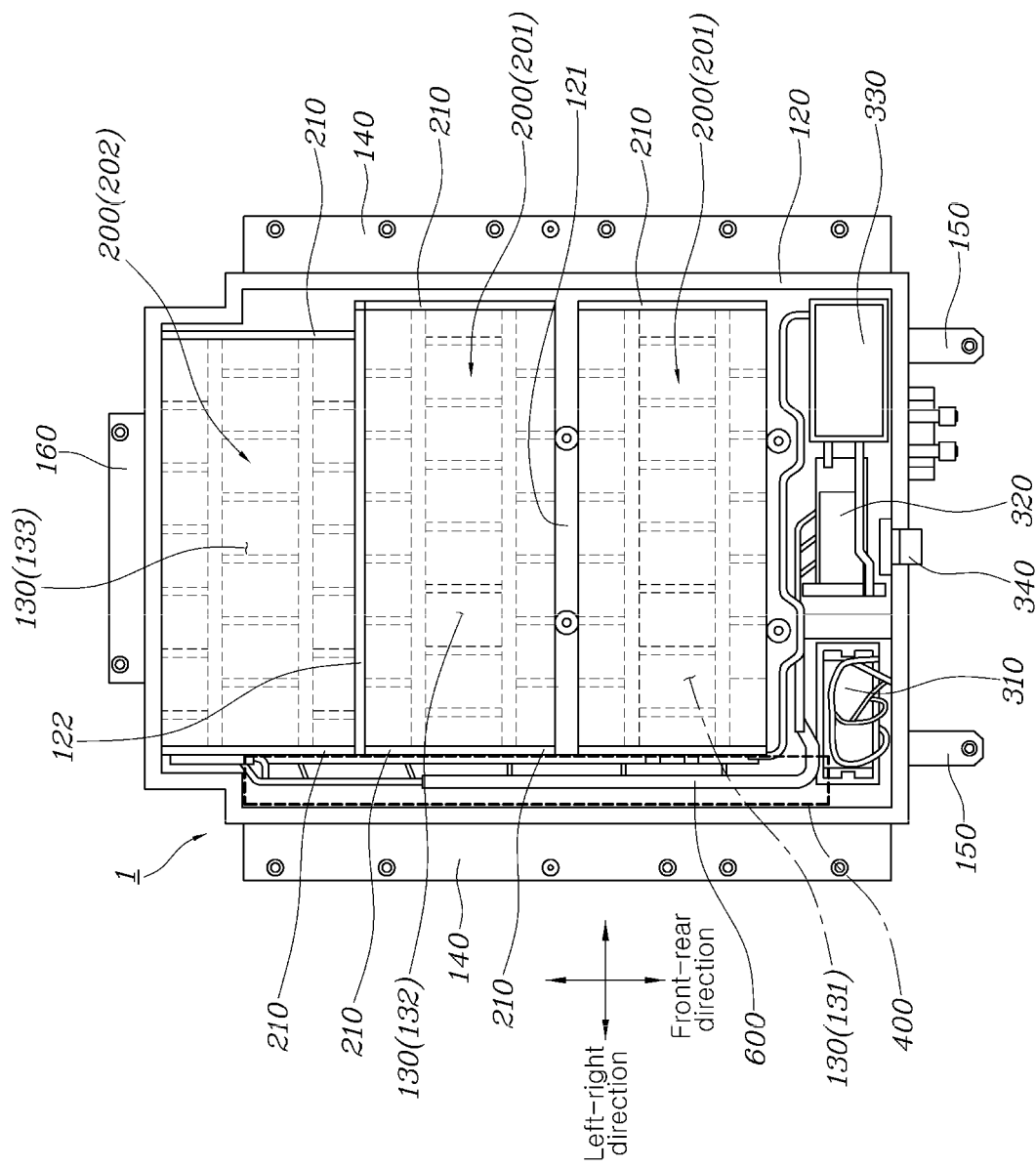
FIG. 3 is a view illustrating the high-voltage battery pack of FIG. 2 in which an upper casing thereof is removed.
Figure 4:
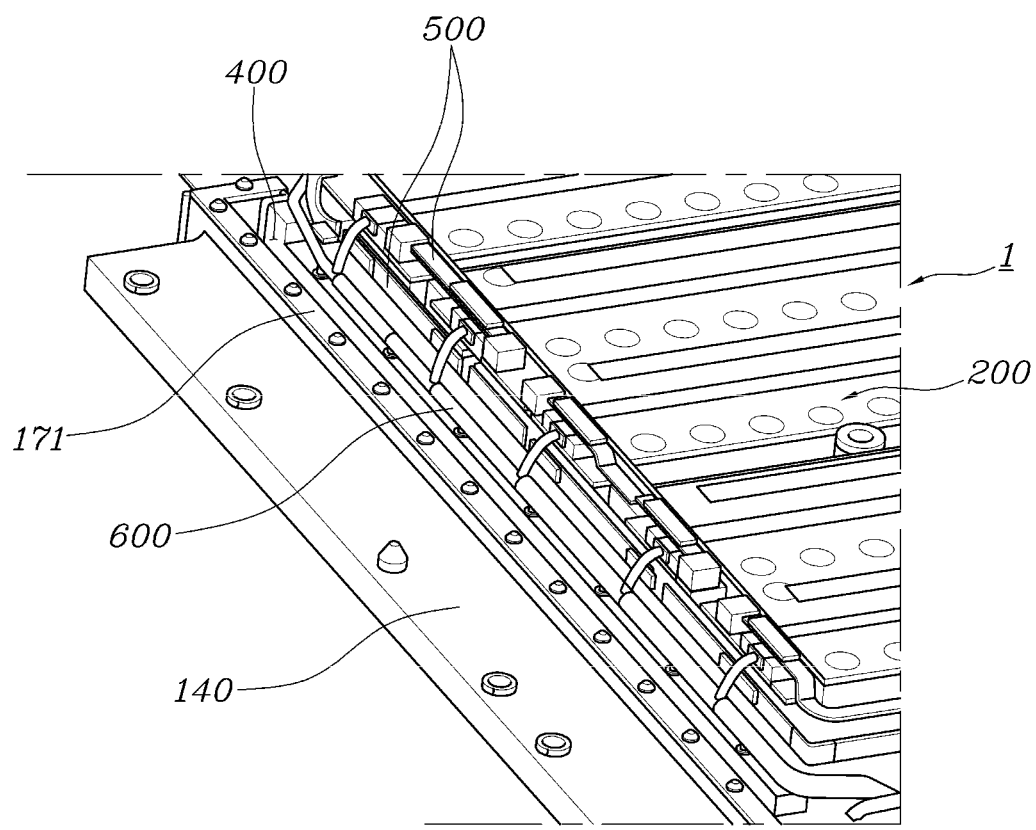
FIGS. 4 and 5 are enlarged views illustrating a portion where a bus bar and a sensing wire are mounted on the high-voltage battery pack according to embodiments of the present invention.
Figure 5:
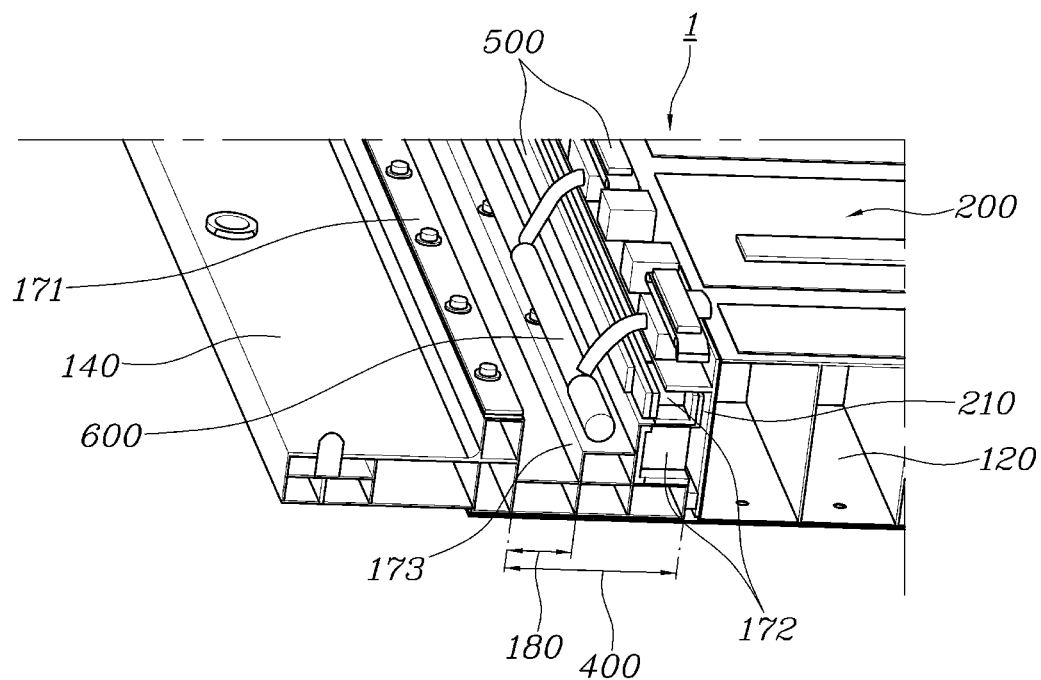

Specific structural or functional descriptions of the embodiments of the present invention disclosed in this specification or application are merely exemplified for the purpose of illustrating the embodiments according to the present invention, and the embodiments of the present invention are implemented in various forms, and may not be construed as being limited to the embodiments described in this specification or application.

Since the embodiments according to the present invention can be diversely modified into various forms, specific embodiments will be illustrated and described in detail in the drawings and the description of the present invention. However, this is not intended to limit the embodiments according to the concept of the present invention to specific disclosure forms, but should be understood to include all modifications, equivalents, or substitutes included in the spirit and scope of the present invention.

It will be understood that although the terms "first", "second", etc. may be used herein to describe various elements, these elements should not be limited by these terms. These terms are only used to distinguish one element from another element. Thus, a first element discussed below could be termed a second element and vice versa without departing from the nature of embodiments of the present invention.

It will be understood that when an element is referred to as being "connected" or "coupled" to another element, it can be directly connected or coupled to the other element or intervening elements may be present therebetween. In contrast, when an element is referred to as being "directly connected" to another element, there are no intervening elements present. Other expressions describing the relationship between the components, such as "between" and "immediately between" or "neighboring" and "directly neighboring" should also be interpreted in the same manner.

The terminology used herein is for the purpose of describing particular embodiments only and is not intended to limit the invention. As used herein, the singular forms "a", "an", and "the" are intended to include the plural forms as well, unless the context clearly indicates otherwise. It will be further understood that the terms "comprises" and/or "comprising", or "includes" and/or "including", when used in this specification, specify the presence of stated features, integers, steps, operations, elements, components or combinations thereof, but do not preclude the presence or addition of one or more other features, integers, steps, operations, elements, components, or combinations thereof.

Unless otherwise defined, the meaning of all terms including technical and scientific terms used herein is the same as that commonly understood by one of ordinary skill in the art to which the present invention belongs. It will be further understood that terms, such as those defined in commonly used dictionaries, should be interpreted as having a meaning which is consistent with their meaning in the context of the relevant art and the present invention, and will not be interpreted in an idealized or overly formal sense unless expressly so defined herein.

A control unit (controller) according to an exemplary embodiment of the present invention may be implemented through a non-volatile memory (not shown) configured to store data about an algorithm configured to control the operation of various components of a vehicle or software instructions for reproducing the algorithm, and a processor (not shown) configured to perform operations described below using the data stored in the corresponding memory. Here, the memory and the processor may be implemented as separate chips. Alternatively, the memory and processor may be implemented as a single integrated chip. The processor may take the form of one or more processors.

Hereinafter, a high-voltage battery pack for a vehicle according to a preferred embodiment of the present invention will be described with reference to FIGS. 1 to 5.

A vehicle using an electric motor as a driving source is essentially provided with a high-voltage battery pack 1 that provides driving power to the electric motor.

The high-voltage battery pack 1 includes a battery casing 100, a plurality of battery modules 200 mounted in the battery casing 100, and a battery management unit (BMU) 310 that detects voltage, current, and temperature of respective unit cells constituting the battery module 200 and controls the operation of the respective unit cells.

The battery casing 100 includes an upper casing no and a lower casing 120 in which a plurality of battery modules 200 and BMUs 310 are mounted, and has a structure in which the battery module-mounted lower casing 120 is covered by the upper casing 110.

The lower casing 120 is formed from an extruded material, providing an advantage of having easy construction and reduced weight.

The battery module 200 includes a plurality of stacked battery cells, a pair of end plates 210 that is coupled to left and right sides of the stacked battery cells to protect the battery cells, and a pair of sensing blocks that is connected to front and rear sides of the stacked battery cells to electrically connect adjacent battery cells.

The high-voltage battery pack 1 according to an embodiment of the present invention is mounted under a vehicle body of a vehicle equipped with a sliding door 3.

Recreational vehicles (RVs) or multi-purpose vehicles (MPVs), which have three or more rows of seats, adopt sliding doors 3 for the convenience of rear seat occupants except for a driver and a passenger on the first row of seats.

In this case, a door rail is installed on a vehicle body in the longitudinal direction of a vehicle such that the sliding door 3 moves forward and backward along the door rail to open and close an interior space of the vehicle.

In the case of a vehicle equipped with a sliding door 3 as described above, the high-voltage battery pack 1 is installed at a lower part of a vehicle body (lower part of a center floor) in order to maximize the usability of the vehicle interior space.

In the case of a structure in which a high-voltage battery pack 1 is installed under a vehicle body in a vehicle equipped with a sliding door 3, a rail mounting space 400 for installing the door rail needs to be secured in the high-voltage battery pack 1.

The rail mounting space 400 secured in the high-voltage battery pack 1 according to embodiments of the present invention is located on one side of the battery module 200 mounted on the lower casing 120 to extend in a front-rear direction thereof.

In addition, the rail mounting space 400 may be formed such that one side thereof facing the battery module 200 is provided in a plane, e.g., a rectangular cross-section plane, extending in a straight line in the front-rear direction.

The battery module 200 mounted on the lower casing 120 may be mounted such that one side thereof facing the rail mounting space 400 extends in a straight line in the front-rear direction.

According to embodiments of the present invention, a bus bar 500 and a sensing wire 600 electrically connecting the battery module 200 and the electric components mounted on the lower casing 120 are mounted to be located in the rail mounting space 400.

Electric components mounted on the lower casing 120 include a BMU 310, a cell management unit (CMU) 320, a power relay assembly (PRA) 330, and a high-voltage connector 340, which are mounted to be located in the front space of the lower casing 120.

A first transverse cross member 121 and a second transverse cross member 122 are mounted in a space of the lower casing 120 in which the battery module 200 is mounted.

The battery module 200 mounted on the lower casing 120 may be mounted to be connected to the first transverse cross member 121 and the second transverse cross member 122, resulting in more firm and stable installation of the battery module 200, which can help improving NVH performance and durability of a vehicle.

The first transverse cross member 121 and the second transverse cross member 122 are reinforcing members mounted for securing collision safety, which extend in a horizontal direction of the high-voltage battery pack while being spaced apart in the front-rear direction of the high-voltage battery pack, so that the lower casing 120 has three battery mounting spaces 130 defined by the first and second transverse cross members 121 and 122.

The three battery mounting spaces 130 may include a first battery mounting space 131 between the front side of the lower casing 120 and the first transverse cross member 121, a second battery mounting space 132 between the first transverse cross member 121 and the second transverse cross member 122, and a third battery mounting space 133 between the second transverse cross member 122 and the rear side of the lower casing 120.

Figure 6:
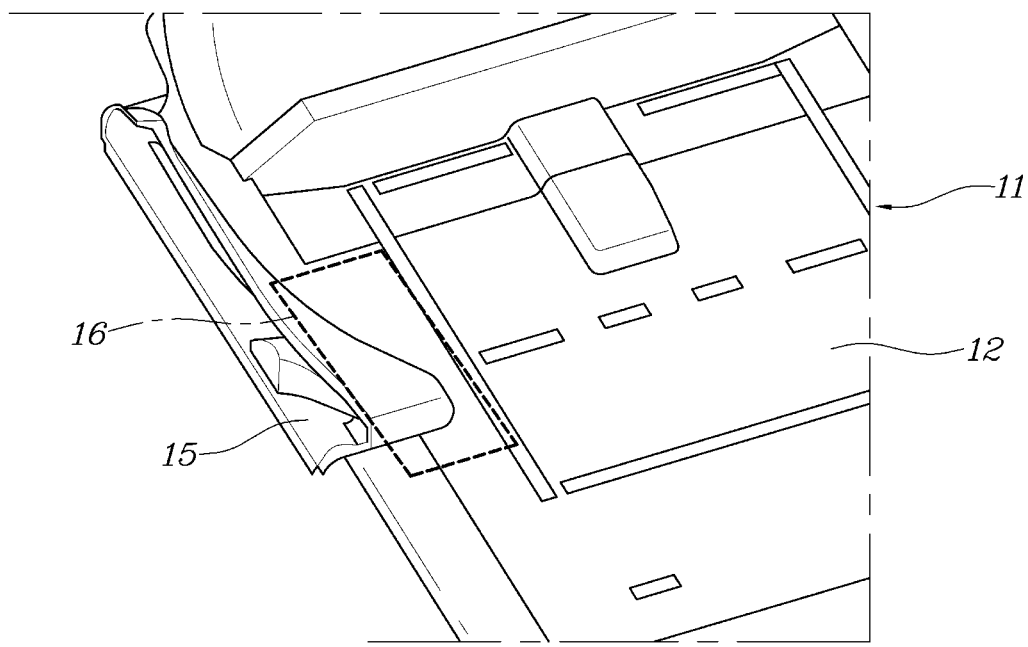
FIGS. 6 and 7 are views illustrating a conventional high-voltage battery pack.
Figure 7:
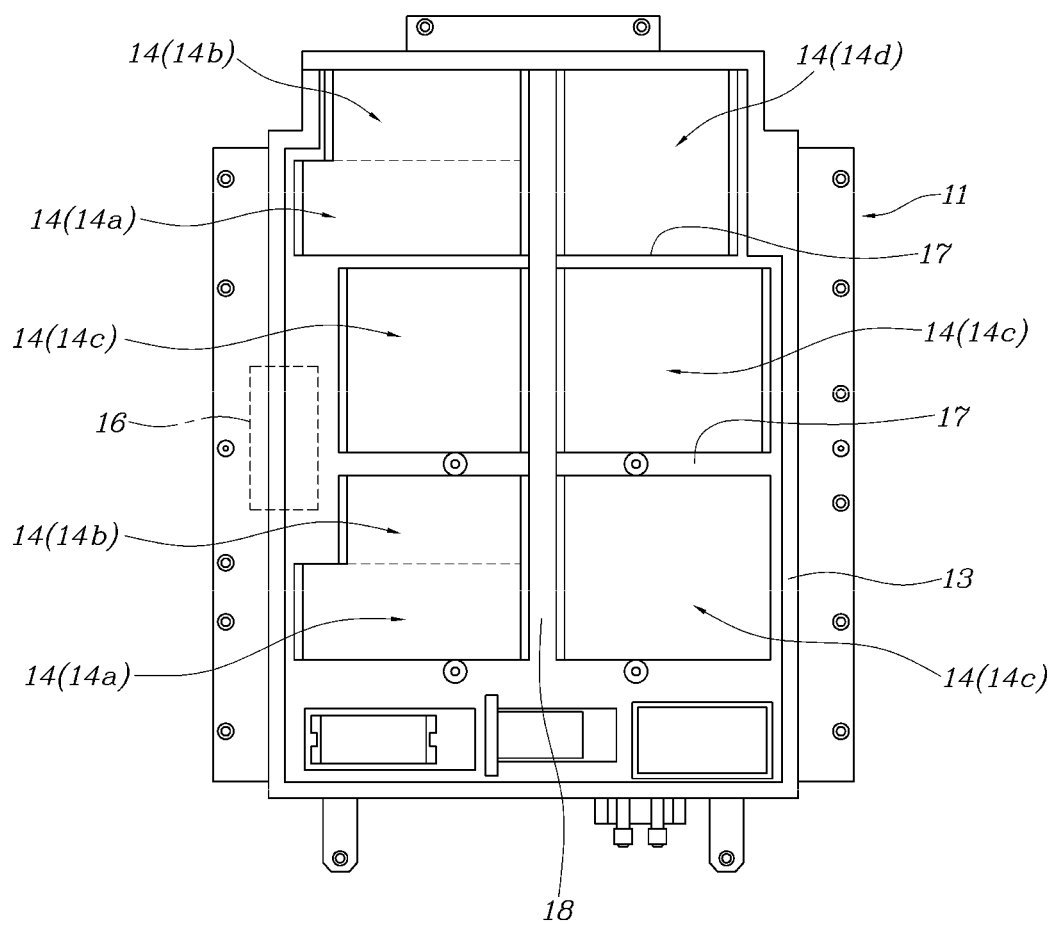

FIGS. 6 and 7 are views illustrating a conventional high-voltage battery pack mounted under a vehicle body in a vehicle equipped with a sliding door.

The conventional high-voltage battery pack 11 includes an upper casing 12 and a lower casing 13 with a rail mounting space 16 secured on one side of a battery module 14 mounted on the lower casing 13 for mounting a door rail 15.

In addition, the conventional high-voltage battery pack 11 is provided with a plurality of transverse cross members 17 and longitudinal cross members 18 on the lower casing 13 in order to secure collision safety, and with a bus bar and a sensing wire for connecting the battery module (battery cells) and electric components using the longitudinal cross members 18.

However, both the rail mounting space 16 and the longitudinal cross members 18 in the conventional high-voltage battery pack 11 are factors that reduce the number of mounted battery cells, and thus the conventional high-voltage battery pack 11 has a disadvantage in that the required energy capacity of the battery cannot be increased.

On the other hand, the high-voltage battery pack 1 according to embodiments of the present invention is characterized in that the rail mounting space 400 for mounting a door rail is secured on one side of the battery module 200 mounted on the lower casing 120 and the bus bar 500 and the sensing wire 600 are mounted using the rail mounting space 400, so that compared to the conventional high-voltage battery pack 11, there is no longitudinal cross member.

As described above, since the high-voltage battery pack 1 according to embodiments of the present invention has no longitudinal cross member in the space of the lower casing 120 where the battery module 200 is mounted, a battery mounting space can be additionally secured and the number of mounted battery cells can be increased through the additionally secured battery mounting space, thereby increasing the battery capacity.

In addition, in the high-voltage battery pack 1 according to embodiments of the present invention, other types of members other than the first transverse cross member 121 and the second transverse cross member 122 are not mounted in the battery mounting space 130. That is, since the conventional longitudinal cross member as described above is not mounted in the battery mounting space 130, there is an advantage of reducing cost and weight through this configuration.

According to embodiments of the present invention, in the three battery mounting spaces 130, the first battery mounting space 131 and the second battery mounting space 132 may have the same size (area), and the third battery mounting space 133 may have a relatively small size compared to the first battery mounting space 131 and the second battery mounting space 132.

Accordingly, in an embodiment of the present invention, the first battery mounting space 131 and the second battery mounting space 132 each accommodate a same type of battery module 200, i.e., the first battery module 201, and the third battery mounting space 133 accommodates a different type of battery module 200 from the first battery module 201, i.e., the second battery module 202.

In other words, in the high-voltage battery pack 1 according to embodiments of the present invention, with the configuration in which the same type of first battery modules 201 are respectively mounted in the first battery mounting space 131 and the second battery mounting space 132 in the lower casing, which have the same size, and the different type of second battery module 202 is mounted in the third battery mounting space 133 having a different size from those of the first and second battery mounting spaces, a total of two types of battery modules 200 are mounted so that the efficiency of the battery mounting space 130 is improved, thereby particularly providing the effect of reducing the types of the battery modules 200 to be mounted on the lower casing 120.

As illustrated in FIG. 7, the conventional high-voltage battery pack 11 has a rail mounting space in the lower casing 13, which is divided by the rail mounting space 16, two transverse cross members 17, and one longitudinal cross member 18 into a total of four sub-spaces having different sizes, in which the first battery module 14a, the second battery module 14b, the third battery module 14c, and the fourth battery module 14d, which are of different types, are respectively mounted.

Therefore, the conventional high-voltage battery pack 11 has a configuration in which a total of four types of battery modules 14 are mounted on the lower casing 13, which has a disadvantage in that the efficiency of the battery mounting space is low, and in particular, various types of battery modules 14 need to be provided, compared to the structure of embodiments of the present invention.

The high-voltage battery pack 1 according to embodiments of the present invention further includes a pair of outer lateral members 140 provided on the left and right sides of the lower casing 120 to extend in the front-rear direction so as to be coupled to a vehicle body and an outer front member 150 and an outer rear member 160, which are provided at the front and rear sides of the lower casing 120 so as to be coupled to the vehicle body.

The outer front member 150 may include a plurality of bracket members, and the outer rear member 160 may be provided to extend in the left-right direction.

As the outer lateral members 140, the outer front member 150, and the outer rear member 160 are coupled to the vehicle body, the high-voltage battery pack 1 can be more firmly mounted.

In addition, the outer lateral members 140, the outer front member iso, and the outer rear member 160 may form a load pass for an external impact.

When the collision energy generated during a collision accident is transferred to the high-voltage battery pack 1 mounted on a vehicle, the outer lateral members 140, the outer front member iso, and the outer rear member 160 form a load pass to transfer and distribute the collision energy toward the vehicle body, so that durability can be improved and stability against collision can be secured.

The lower casing 120 is provided with a protrusion 171 for coupling with the upper casing no at a position spaced apart outward from one lateral side of the battery module 200 to extend in the front-rear direction.

A flange portion of the upper casing no comes into contact with the protrusion 171 of the lower casing 120 and then is hermetically coupled thereto by means of bolts.

The protrusion 171 of the lower casing 120 serves as a boundary delimiting the rail mounting space 400 and the outer lateral member 140. That is, based on the protrusion 171 of the lower casing 120, the space between the protrusion and the battery module 200 becomes the rail mounting space 400, and the opposite portion becomes the outer lateral member 140.

The lower casing 120 may be provided with a first support part 172 in close contact with one lateral side of the battery module 200 in the rail mounting space 400 and extending in the front-rear direction such that the bus bar 500 is supported on the first support part 172, which allows the bus bar 500 to be mounted in a stable support structure.

In addition, the lower casing 120 may be provided with a second support part 173 extending in the front-rear direction while being connected to the first support part 172 such that the sensing wire 600 is supported on the second support part 173, which allows the sensing wire 600 to be mounted in a stable support structure.

According to embodiments of the present invention, the protrusion 171 and the second support part 173 may be spaced apart from each other by a predetermined distance, so that a safety space 180 is secured therebetween. The safety space 180 serves to absorb collision energy in the event of a lateral collision, and the bus bar 500 and the sensing wire 600 can be disposed toward the battery module 200 as much as possible through the safety space 180, so that the safety of the bus bar 500 and the sensing wire 600 can be secured upon the lateral collision.

As set forth in the foregoing, in the high-voltage battery pack for a vehicle according to embodiments of the present invention, with the configuration in which the rail mounting space 400 for mounting the door rail is secured on one side of the battery module 200 mounted on the lower casing 120, the bus bar 500 and the sensing wire 600 connecting the battery module (battery cells) and electric components are mounted by utilizing the rail mounting space 400, and not the longitudinal cross member, but the first and second transverse cross members 121 and 122 are only mounted in the space of the lower casing 120 where the battery module 200 is mounted, it is possible to additionally secure the battery mounting space 130 by utilizing the space for the omitted longitudinal cross member, and increase the number of battery cells to be mounted, by using the additionally secured battery mounting space 130, thereby providing the effect of increasing the battery capacity.

In addition, the high-voltage battery pack 1 according to embodiments of the present invention has the configuration in which the longitudinal cross member is not mounted in the battery mounting space 130 of the lower casing 120, thereby achieving a reduction in cost and weight.

In addition, in the high-voltage battery pack 1 according to embodiments of the present invention, with the configuration in which the same type of first battery modules 201 each are mounted in the first battery mounting space 131 and the second battery mounting space 132 in the lower casing 120, which have the same size, and the different type of second battery module 202 is mounted in the third battery mounting space 133 having a different size from those of the first and second battery mounting spaces, a total of two types of battery modules 200 are mounted so that the efficiency of the battery mounting space 130 is improved, thereby particularly providing the effect of reducing the types of the battery modules 200 to be mounted on the lower casing 120.

Although the present invention has been described and illustrated with respect to the specific embodiments, it would be obvious to those skilled in the art that various improvements and modifications are possible, without departing from the scope and spirit of the present invention as disclosed in the accompanying claims.

What is claimed is:

1. A high-voltage battery pack for mounting under a vehicle body in a vehicle equipped with a sliding door, the high-voltage battery pack comprising:
a lower casing in which a battery module is mounted, the lower casing defining a rail mounting space to mount a door rail on a lateral side of the battery module, the rail mounting space extending in a front-rear direction; and
a bus bar and a sensing wire both mounted in the rail mounting space to electrically connect the battery module and electric components mounted on the lower casing,
wherein the lower casing comprises first and second transverse cross members extending in a horizontal direction of the lower casing while being spaced apart in the front-rear direction, the first and second transverse cross members defining a first battery mounting space, a second battery mounting space, and a third battery mounting space in the lower casing, and
wherein the first battery mounting space and the second battery mounting space have a same size and the third battery mounting space has a relatively smaller size compared to the first battery mounting space and the second battery mounting space.

2. The high-voltage battery pack according to claim 1, wherein the first battery mounting space and the second battery mounting space each accommodate a first type of battery module and the third battery mounting space accommodates a second type of battery module different from the first type of battery module.

3. The high-voltage battery pack according to claim 1, wherein no casing members other than the first and second transverse cross members are mounted in the first battery mounting space, the second battery mounting space, and the third battery mounting space.

4. The high-voltage battery pack according to claim 1, wherein the rail mounting space comprises a first side facing the battery module and provided in a plane extending in a straight line in the front-rear direction, and wherein the battery module is mounted such that a first side of the battery module facing the rail mounting space extends in a straight line in the front-rear direction.

5. A vehicle comprising:
the vehicle body;
the high-voltage battery pack according to claim 1 mounted under the vehicle body;
the door rail mounted in the rail mounting space; and
the sliding door configured to slide along the door rail.

6. A high-voltage battery pack for mounting under a vehicle body in a vehicle equipped with a sliding door, the high-voltage battery pack comprising:
a lower casing in which a battery module is mounted, the lower casing comprising a rail mounting space to mount a door rail on a lateral side of the battery module, the rail mounting space extending in a front-rear direction, wherein the lower casing comprises a protrusion configured to be coupled with an upper casing at a position spaced apart outwards from a first lateral side of the battery module to extend in the front-rear direction;
a bus bar and a sensing wire both mounted in the rail mounting space to electrically connect the battery module and electric components mounted on the lower casing; and
a pair of outer lateral members provided on left and right sides of the lower casing to extend in the front-rear direction and configured to be coupled to the vehicle body, wherein based on the protrusion, a space between the battery module and the protrusion defines the rail mounting space, and an opposite portion defines the pair of outer lateral members.

7. The high-voltage battery pack according to claim 6, wherein the lower casing comprises a first support part in close contact with the first lateral side of the battery module in the rail mounting space and extending in the front-rear direction, and wherein the bus bar is supported on the first support part.

8. The high-voltage battery pack according to claim 7, wherein the lower casing comprises a second support part extending in the front-rear direction while being connected to the first support part, and wherein the sensing wire is supported on the second support part.

9. The high-voltage battery pack according to claim 8, wherein the protrusion and the second support part are spaced apart from each other by a predetermined distance to define a safety space therebetween.

10. The high-voltage battery pack according to claim 6, further comprising an outer front member and an outer rear member provided at front and rear sides of the lower casing and configured to be coupled to the vehicle body.

11. The high-voltage battery pack according to claim 10, wherein the pair of outer lateral members, the outer front member, and the outer rear member define a load pass for an external impact.

12. A vehicle comprising:
the vehicle body;
the high-voltage battery pack according to claim 6 mounted under the vehicle body;
the door rail mounted in the rail mounting space; and
the sliding door configured to slide along the door rail.

13. A vehicle comprising:
a vehicle body;
a lower casing of a high-voltage battery pack mounted under the vehicle body, the lower casing defining a rail mounting space on a lateral side of a battery module mounted in the lower casing, the rail mounting space extending in a front-rear direction;
a bus bar and a sensing wire both mounted in the rail mounting space to electrically connect the battery module and electric components mounted on the lower casing; and
an upper casing coupled to the lower casing;
a pair of outer lateral members on left and right sides of the lower casing extending in the front-rear direction, the pair of outer lateral members being coupled to the vehicle body;
an outer front member and an outer rear member at front and rear sides of the lower casing, respectively, the outer front member and the outer rear member being coupled to the vehicle body;
a door rail mounted in the rail mounting space; and
a sliding door configured to slide along the door rail.

14. The vehicle according to claim 13, wherein the lower casing comprises first and second transverse cross members extending in a horizontal direction of the lower casing while being spaced apart in the front-rear direction, the first and second transverse cross members defining a first battery mounting space, a second battery mounting space, and a third battery mounting space in the lower casing.

15. The vehicle according to claim 14, wherein the first battery mounting space and the second battery mounting space have a same size and the third battery mounting space has a relatively smaller size compared to the first battery mounting space and the second battery mounting space.

16. The vehicle according to claim 15, wherein the first battery mounting space and the second battery mounting space each accommodate a first type of battery module and the third battery mounting space accommodates a second type of battery module different from the first type of battery module.

17. The vehicle according to claim 13, wherein the lower casing comprises a protrusion coupled with the upper casing at a position spaced apart outwards from a first lateral side of the battery module to extend in the front-rear direction, wherein based on the protrusion, a space between the battery module and the protrusion defines the rail mounting space, and an opposite portion defines the pair of outer lateral members.

18. The vehicle according to claim 17, wherein the lower casing comprises:
a first support part in close contact with the first lateral side of the battery module in the rail mounting space and extending in the front-rear direction; and
a second support part extending in the front-rear direction while being connected to the first support part.

19. The vehicle according to claim 18, wherein:
the bus bar is supported on the first support part;
the sensing wire is supported on the second support part; and
the protrusion and the second support part are spaced apart from each other by a predetermined distance to define a safety space therebetween.

\* \* \* \* \*